United States Patent
Nefian et al.

(10) Patent No.: US 7,389,502 B2
(45) Date of Patent: Jun. 17, 2008

(54) PROGRAM PHASE DETECTION FOR DYNAMIC OPTIMIZATION

(75) Inventors: Ara V. Nefian, San Jose, CA (US);
Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 10/815,288

(22) Filed: Mar. 31, 2004

(65) Prior Publication Data

US 2005/0223371 A1   Oct. 6, 2005

(51) Int. Cl.
*G06F 9/45* (2006.01)

(52) U.S. Cl. .................. 717/158; 717/153; 717/154

(58) Field of Classification Search ............... None
See application file for complete search history.

(56) References Cited

U.S. PATENT DOCUMENTS

| | | | | |
|---|---|---|---|---|
| 5,151,981 A | * | 9/1992 | Westcott et al. | 714/50 |
| 5,269,017 A | * | 12/1993 | Hayden et al. | 714/15 |
| 6,374,367 B1 | * | 4/2002 | Dean et al. | 714/37 |

* cited by examiner

*Primary Examiner*—Tuan Dam
*Assistant Examiner*—Chuck Kendall
(74) *Attorney, Agent, or Firm*—Blakely, Sokoloff, Taylor & Zafman LLP

(57) ABSTRACT

A method, apparatus and system including selecting a phase threshold value, receiving a plurality of sequenced buffers, determining a distance between centers of at least two consecutive histogram bins, comparing the distance with the selected threshold value, and determining major execution phases of an executable process based on the comparison.

18 Claims, 4 Drawing Sheets

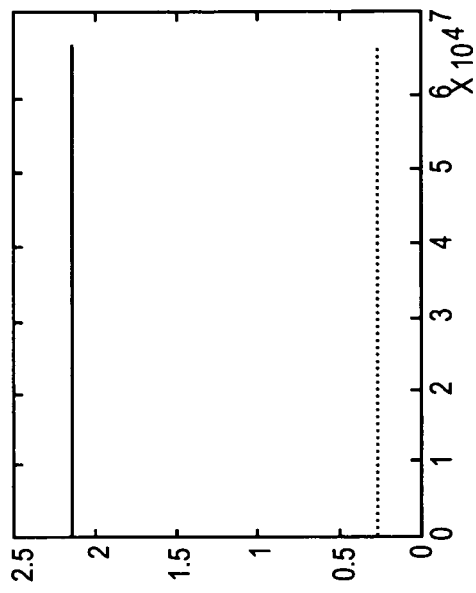
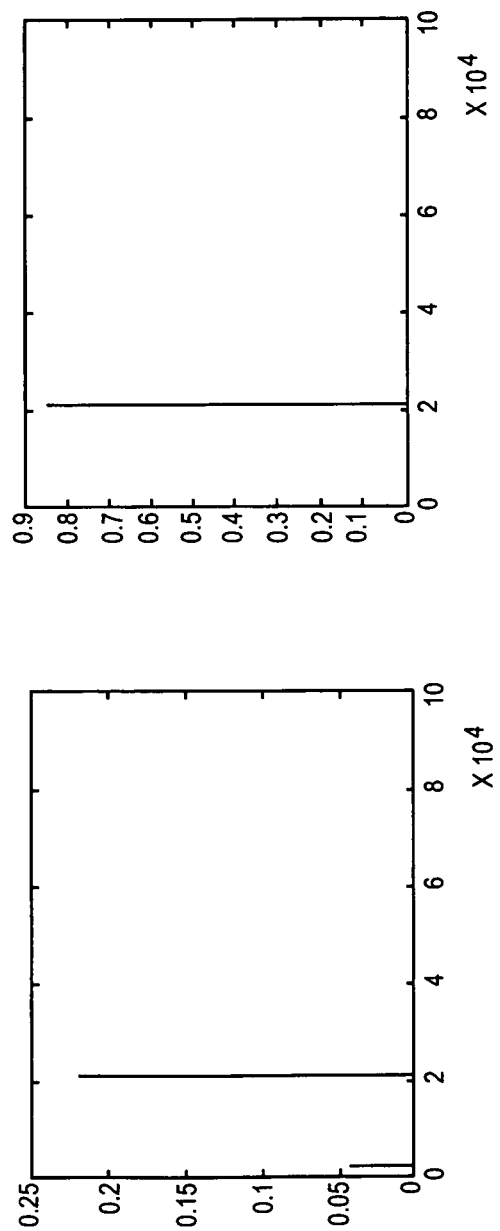

PROGRAM PHASE DETECTION FOR DYNAMIC OPTIMIZATION

BACKGROUND

1. Field

The embodiments relate to managed runtime computer system environment technology, and more particularly to dynamic optimization through phase detection.

2. Description of the Related Art

Computer programs that are designed to run on managed runtime environments (MRTEs) are distributed in a neutral bytecode format and must be compiled to native machine code by a dynamic compiler. The performance of managed applications depends on the quality of optimization and code generation performed by a compiler. System utilization monitoring can be used to determine when various applications may need to be optimized. As the number of applications running on a system increases, the need for application optimization increases as well.

Many microprocessor architectures rely on compiler optimizations for performance. Some architectures rely heavily on expensive and sophisticated code-generation optimizations (such as global scheduling and control speculation) for performance.

In order to optimize executable code, performance feedback and optimization techniques are used. The problem with these techniques is that they are usually intended for hardware implementations or are ad hoc, and thus not suitable for dynamic optimization or software implementations. Moreover, many optimizations require a wait-and-see approach as different optimization criteria are experimented with to achieve optimization. This can be time consuming and may only optimize an application for a short time due to system usage change.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 2 illustrates a graph of an example buffer of branch trace buffers (BTrB) sample addresses over time.

FIG. 3 illustrates the histograms corresponding to two phases detected.

DETAILED DESCRIPTION

The Embodiments discussed herein generally relate to a method and system for dynamically detecting stable process phases. Referring to the figures, exemplary embodiments will now be described. The exemplary embodiments are provided to illustrate the embodiments and should not be construed as limiting the scope of the embodiments.

Figure 1:
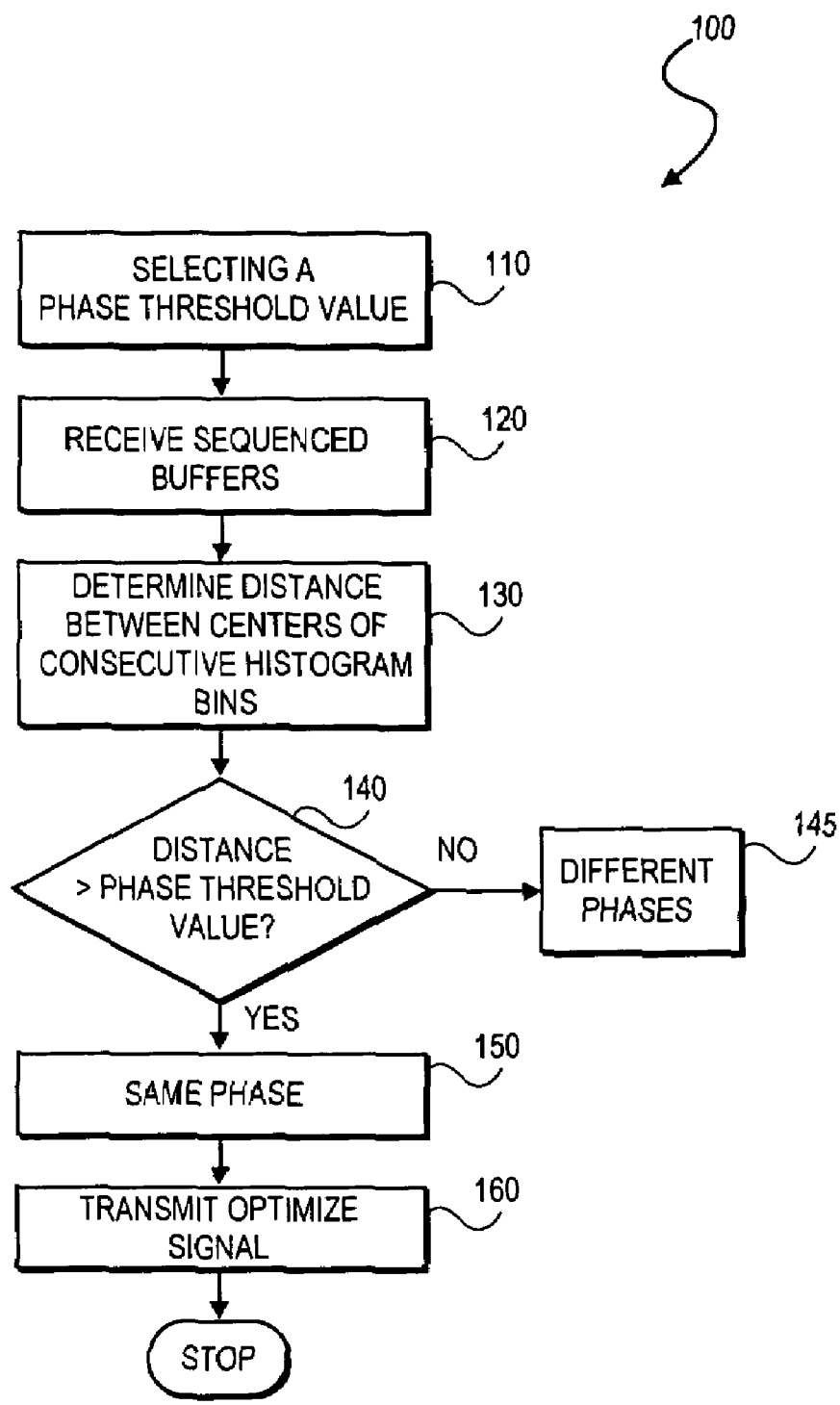
FIG. 1 illustrates one embodiment of a process to detect stable program phases.

Systems that have dynamic profile guided optimizations (e.g., managed runtime environments, dynamic binary optimizers, and dynamic binary translators) try to determine when to dynamically re-optimize an executing program. FIG. 1 illustrates one embodiment of a process to detect stable program phases for use in dynamic optimization of executable code. Process 100 begins at block 110 with selecting of a phase threshold value. The phase threshold value can be a function of a number of M consecutive samples of branch addresses sampled at a time t. In one embodiment a user selects the phase threshold value and enters the value as predetermined static parameters in a process. The phase threshold values can also be dynamically modified through a user input device as well.

Process 100 continues with block 120. In block 120, a number of sequenced buffers are received. In one embodiment, a performance-monitoring unit (PMU) collects the sequenced branch trace buffers (BTrB). The sequenced buffers can be stored in local memory or in files. The buffers received include addresses of the last L branches taken. The value of L can be predetermined or selected by a user (e.g., 4, 8, 10, etc.). The buffers of the addresses of the branches taken are for a particular sampling moment in time. FIG. 2 illustrates a graph of an example buffer of BTrB sample addresses over time during execution of an example program, such as a benchmarking program.

After block 120 is complete process 100 continues with block 130. Block 130 determines a distance between centers of at least two consecutive histogram bins. In one embodiment a vector of branch addresses are determined as follows: $b_t = (b_{t,1}, \ldots b_{t,L})^T$ is a vector of branch addresses representing a single BTrB sample at time t. $B_t = b_t, b_{t+1}, \ldots b_{tM}$ is a buffer of M consecutive samples made available at one moment of time. M is either predetermined or dynamically adjusted by a user, e.g., 1000, 1400, 1820, etc. A stable phase is defined as a one-dimensional histogram of $B_t$, and denoted as $H_t = [h_{t,1}, \ldots h_{t,N}]^T$. The histogram $H_t$ is a vector of size N where N is the total number of histogram bins. $W_1, \ldots W_N$ is a set of equally spaced and non-overlapping histogram bins that cover the entire space of possible branch addresses. $\Delta W = W_k - W_{k-1}$ is the distance between the centers of two consecutive histogram bins. In one embodiment, a Euclidian distance calculation is used to measure distance, i.e. distance $$(H_k, H_1) = \left[ \sum_{i=1}^{N} (h_{k,i} - h_{1,i})^2 \right]^{0.5}.$$

It should be noted that other distance calculations known in the art can be used as well without deviating from the scope of the embodiments.

After block 130 has completed, block 140 compares the determined distance with the phase threshold value. If the distance between the two consecutive histogram bins is equal to or larger than the phase threshold value, then the samples in $B_k$ and $B_l$ belong to different phases, otherwise the samples belong to the same phase. Therefore, major execution phases of an executable process are determined based on the comparison result.

After block 140 is completed, process 100 continues with block 150 if the samples in $B_k$ and $B_l$ belong to the same phase. In one embodiment a variable indicating same phase is set. If the samples in $B_k$ and $B_l$ belong to the different phases, in one embodiment block 145 sets a variable indicating different phases. In one embodiment, block 160 transmits a signal to re-optimize an executing process. The signal can be transmitted, for example, to a dynamic compiler.

It should be noted that increasing the distance width of the histogram bins ΔW coarsens the resolution and decreases the complexity of phase detection process 100. A coarse resolution is used for phase detection while a fine resolution is used for hot trace detection. Setting ΔW=1 places every single branch address in a separate histogram bin. This creates a fine-grained histogram. The result of creating a fine-grained histogram is that phase detection process 100 slows down and potentially increases the number of phases. Setting ΔW>>1 places branch addresses that are in the same memory region into the same histogram bin. This results in creating a coarse-grained histogram. Creating a coarse grain histogram speeds up phase detection process 100 and reduces the number of phases. By varying the ΔW an analysis of the histograms at different resolutions can be made. Therefore a dynamic trade off of phase detection overhead with phase detection precision can be accomplished. In one embodiment process 100's determination of major execution phases is a dynamic process performed at a predetermined periodic rate. For example, process 100 can be performed at a chosen rate, such as every 5 minutes, hour, 24 hours, etc. In another embodiment, process 100 is manually performed as selected by a user.

Figure 4:
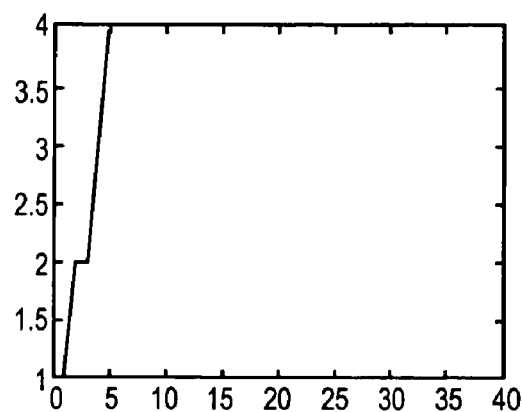
FIG. 4 illustrates the sequence of phases detected when using the data in FIG. 2.

For example purposes, the graph illustrated in FIG. 2 of an example buffer of BTrB sample addresses over time during execution of an example program had the following settings: L=4, M=1820, ΔW=$10^5$, and phase threshold=0.4M. FIG. 3 illustrates the histograms corresponding to two phases detected and FIG. 4 illustrates the sequence of phases detected when using the data in FIG. 2 for 37 blocks of data.

Process 100 can be used in systems that make use of dynamic profile guided optimizations, such as MRTEs, dynamic binary optimizers, and dynamic binary translators. These types of systems contain hardware performance monitoring and rely on profile-guided optimizations for performance.

Figure 5:
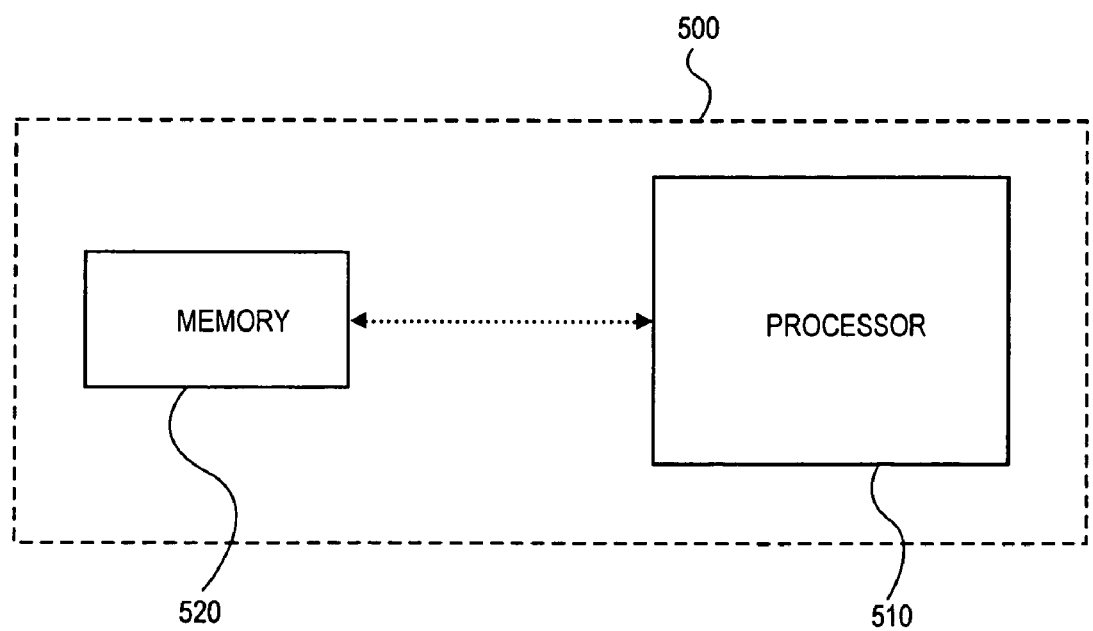
FIG. 5 illustrates an embodiment of a system.

FIG. 5 illustrates an embodiment of a system. System 500 includes processor 510 connected to memory 520. In one embodiment memory 520 is a main memory, such as random-access memory (RAM), static random access memory (SRAM), dynamic random access memory (DRAM), synchronous DRAM (SDRAM), read-only memory (ROM), etc. In another embodiment, memory 520 is a cache memory. Process 100 is in the form of an executable process running in processor 510 and communicating with memory 520. In this embodiment process 100 is a phase detector process that determines major execution phases of another executable process running in memory 520. In system 500, process 100 determines when to re-optimize the other executable process running in system 500. System 500 can be combined with other known elements depending on the implementation. For example, if system 500 is used in a multiprocessor system, other known elements typical of multiprocessor systems would be coupled to system 500. System 500 can be used in a variety of implementations, such as personal computers (PCs), personal desk assistants (PDAs), notebook computers, servers, MRTEs, dynamic binary optimizers, dynamic binary translators, etc. In one embodiment, the phase detector process 100 exists as a hardware unit having logic and a receiver to receive buffers. The logic elements of the phase detector include circuitry to perform the instructions that process 100 performs, as described above.

Figure 6:
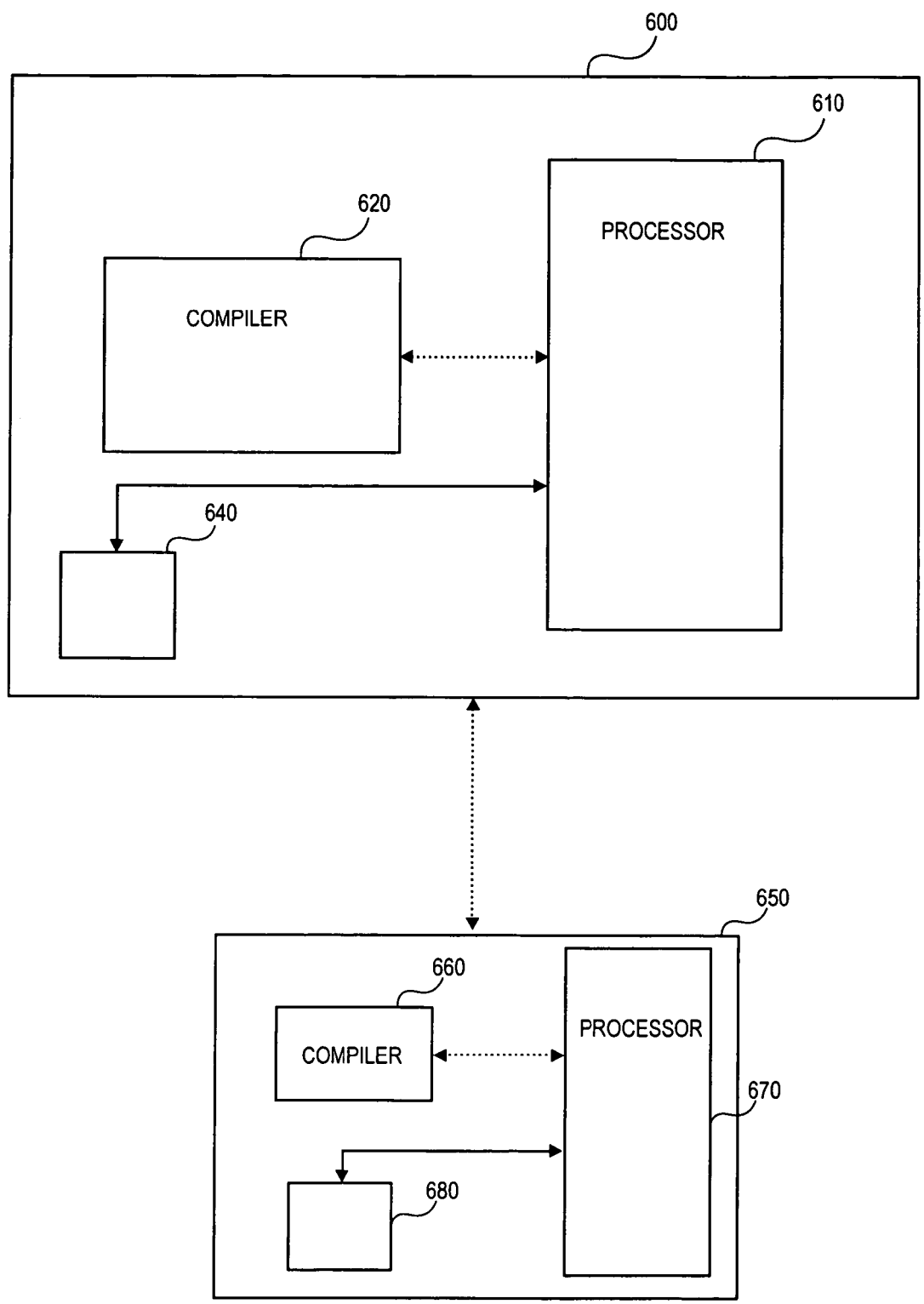
FIG. 6 illustrates an embodiment of a system coupled to another system.

FIG. 6 illustrates a system 600 coupled to a system 650. System 600 includes at least one processor 610, a compiler 620 and a memory 640 Depending on implementation, system 600 also includes other known elements of typical systems, such as multiprocessor systems, PCs, PDAs, etc. Compiler 620 is a dynamic compiler. System 650 includes processor 670 memory 680 and compiler 680. Compilers 620 and 680 are dynamic compilers in one embodiment. In one embodiment process 100 is in the form of an executable process running in system 600 or 650. In this embodiment process 100 is a phase detector process that determines major execution phases of another executable process running in system 600 and/or 650. That is, process 100 can run in system 600 to detect major execution phases in system 650, and/or process 100 can run in system 650 to detect major execution phases in system 600. Systems 600 and 650 can be co-located, distributed systems, or networked systems. In one embodiment memory 640 and memory 680 can each be a main memory (such as random-access memory (RAM), static random access memory (SRAM), dynamic random access memory (DRAM), synchronous DRAM (SDRAM), read-only memory (ROM), etc.) or cache memory. In one embodiment, a phase detector is a hardware unit having logic and a receiver to receive buffers. The logic elements of the phase detector include circuitry to perform the instructions that process 100 performs, as described above.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of determining where compiler optimization can be implemented comprising:
    selecting a phase threshold value,
    receiving a plurality of branch trace buffers in sequence, the plurality of branch trace buffers including a plurality of branch addresses,
    determining a plurality of branch address vectors from the plurality of branch addresses,
    determining histogram bins for the plurality of branch address vectors,
    determining a distance between centers of at least two consecutive histogram bins,
    comparing the distance with said selected threshold value,
    determining major execution phases of an executable process based on the comparison, and
    using the determined major execution phases for determining where compiler optimization is needed to improve performance in a managed run-time environment.

2. The method of claim 1, said plurality of trace buffers comprising samples containing addresses of a plurality of branches taken at a sampling time.

3. The method of claim 1, where a result of said determining major execution phases is used for dynamically compiling executable code to optimize said executable code.

4. An apparatus comprising a storage device containing instructions which, when executed cause a machine to:
select a phase threshold value,
receive a plurality of branch trace buffers in sequence, the plurality of branch trace buffers including a plurality of branch addresses,
determine a plurality of branch address vectors from the plurality of branch addresses,
determine histogram bins for the plurality of branch address vectors,
determine a distance between centers of at least two consecutive histogram bins, where said at least two histogram bins are non-overlapping,
compare the distance with said selected threshold value,
determine major execution phases of an executable process based on a result of the compare, and
use the determined major execution phases for determining where compiler optimization is needed to improve performance in a managed run-time environment.

5. The apparatus of claim 4, wherein said determine major execution phases is dynamic at a predetermined periodic rate.

6. The apparatus of claim 4, wherein said determine major execution phases is manually commenced.

7. The apparatus of claim 4, said plurality of branch trace buffers in sequence comprising samples containing addresses of a plurality of branches taken at a sampling time.

8. The apparatus of claim 4, where a result of said determine major execution phases instruction is used for dynamically compiling executable code to optimize said executable code.

9. A system comprising:
a processor coupled to one of a main memory and a cache memory,
at least one process to communicate with said memory, and
a phase detector that operates to determine major execution phases of said at least one process and to comparing a distance between centers of at least two consecutive histogram bins for a plurality of branch address vectors determined from a plurality of branch addresses with a threshold value to determine where compiler optimization is needed to improve performance of the at least one process in a managed run-time environment.

10. The system of claim 9, said phase detector including a receiver to receive a plurality of branch trace buffers in sequence, the plurality of branch trace buffers including said plurality of branch address,
said phase detector operates to:
determines said plurality of branch address vectors,
determine histogram bins from the plurality of branch address vectors, and
determine said distance between centers of said at least two consecutive histogram bins, where said at least two histogram bins are non-overlapping.

11. The system of claim 10, said phase detector having logic to:
determine the plurality of consecutive branch addresses representing a branch trace buffer,
determine a stable phase histogram for a plurality of consecutive branch addresses, and
determine a plurality of equally spaced and non-overlapping histogram bins for all possible branch addresses.

12. The system of claim 9, wherein said phase detector having logic to determine major execution phases dynamically at a predetermined periodic rate.

13. The system of claim 10, said plurality of branch trace buffers comprising samples containing addresses of a plurality of branches taken at a sampling time.

14. A system comprising:
a first device having a first processor coupled to a first memory and at least one process to communicate with said first memory, and
a second device having a second processor coupled to a second memory and at least another process to communicate with said second memory,
wherein a phase detector process operating in one of said first processor and said second processor operates to compare a distance between centers of centers of at least two consecutive histogram bins for a plurality of branch address vectors determined from a plurality of branch addresses with a threshold value to determine major execution phases of one of said one process and said another process within one of said first device and said second device for determining where compiler optimization is needed for one of said one process and said another process to improve performance in a managed run-time environment.

15. The system of claim 14, said phase detector having logic to:
receive a plurality of trace buffers in sequence, the plurality of trace buffers including a plurality of branch addresses,
determine the plurality of branch address vectors,
determine the histogram bins for the plurality of branch address vectors,
determine the distance between centers of the at least two consecutive histogram bins, where said at least two histogram bins are non-overlapping, and
compare the distance with the predetermined threshold value.

16. The system of claim 15, said phase detector having logic to:
determine a plurality of consecutive branch addresses representing a branch trace buffer,
determine a stable phase histogram for the plurality of consecutive branch addresses, and
determine a plurality of equally spaced and non-overlapping histogram bins for all possible branch addresses.

17. The system of claim 14, wherein said phase detector having logic to determine major execution phases dynamically at a predetermined periodic rate.

18. The system of claim 15, said plurality of sequenced buffers comprising samples containing addresses of a plurality of branches taken at a sampling time.

* * * * *